July 31, 1923.
1,463,201
F. DEURING
DRIVING MECHANISM FOR TRANSVERSE SUPPORTS OR SLIDES IN REVOLVER LATHES, SEMIAUTOMATIC LATHES, AND THE LIKE
Filed Aug. 28, 1920
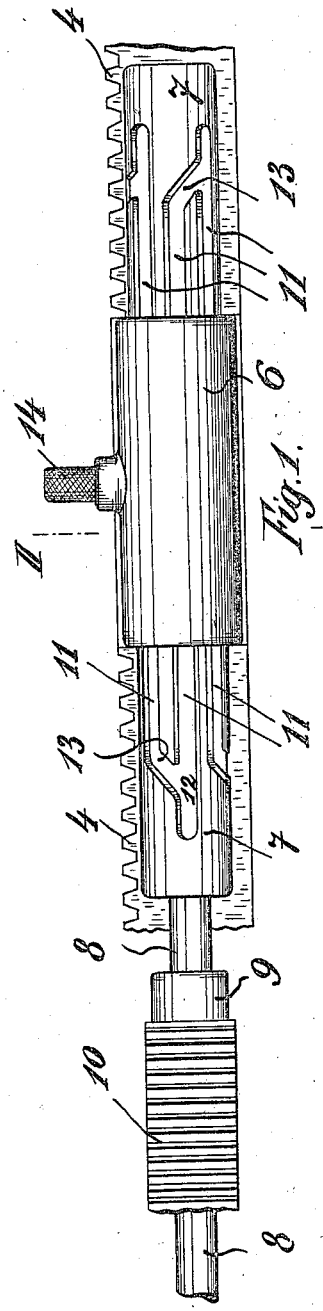
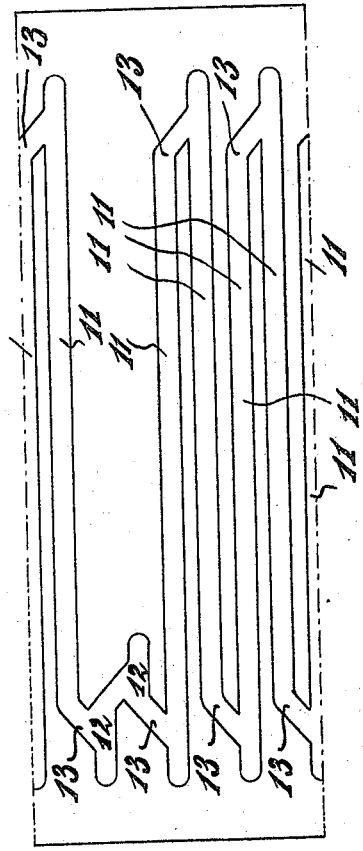
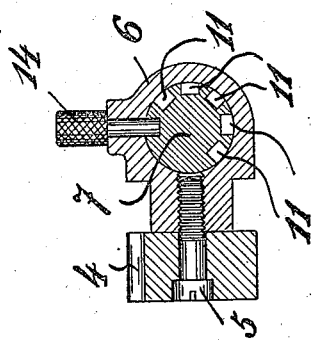
Inventor,
Fritz Deuring
By Knight Bros.,
Attys Patented July 31, 1923.

1,463,201

UNITED STATES PATENT OFFICE.

FRITZ DEURING, OF MUNCHEN-GLADBACH, GERMANY.

DRIVING MECHANISM FOR TRANSVERSE SUPPORTS OR SLIDES IN REVOLVER LATHES, SEMIAUTOMATIC LATHES, AND THE LIKE.

Application filed August 28, 1920. Serial No. 406,713.

*To all whom it may concern:*

Be it known that I, FRITZ DEURING, a subject of the German Republic, and residing at Munchen-Gladbach, Hohenzollernstrasse 134, Germany, have invented certain new and useful Improvements in Driving Mechanism for Transverse Supports or Slides in Revolver Lathes, Semiautomatic Lathes, and the like (for which I have filed applications in Germany June 25, 1919; in France June 12, 1920; in Austria June 17, 1920; in Sweden June 11, 1920; in England June 24, 1920; and in Belgium June 26, 1920), of which the following is a specification.

For driving the transverse supports or slides of revolver lathes, semi-automatic lathes and the like, a separate cam drum is commonly used whose rate of revolution is generally in the ratio of 1:4, to that of the longitudinal slide, as the latter performs its travel four times while the transverse slide is working once. Accordingly the advance and return cam way for the transverse slide must be disposed on a quarter of the drum surface, so that the steepness of the curve is four times as great as that for the longitudinal slide. The steep curve requires a large amount of power and imparts heavy lateral pressure to the roller transmitting the feed, which causes the roller carrier to jam and knock. This results in a jerky movement of the transverse supports.

The separate cam has, moreover, the important disadvantage that change-over of the transverse support movement from one side of the revolver to the other is only possible by tedious screwing of cams or changing of gear wheels. The constructions hitherto known always allow some elastic play to the driving parts, which greatly interferes with the steadiness of the feed.

The purpose of my invention is to remove these disadvantages and to secure, with a minimum of constructional parts, an absolutely steady and uniform feed. This is mainly attained by the fact that the member (rack-bar or the like) effecting the feed of the transverse supports is coupled at intervals with the reciprocating member actuating the longitudinal slide. For this purpose the reciprocating rack-bar actuating the longitudinal slide may have fixed to it a box or sleeve embracing a cylindrical cam member coupled with the rack actuating the transverse supports, this sleeve being at intervals coupled with the cylindrical member so as to actuate it for movement of the transverse supports, but normally sliding over it. A convenient device for this purpose is a stud or pin inserted into the wall of the sleeve and sliding in an endless groove in the cylindrical member so disposed that in the course of several to and fro movements of the sleeve, for example three, the stud only rotates the cylindrical member about its longitudinal axis, but that in the course of the last (for example the fourth) reciprocating movement it takes the cylinder with it and brings it back to its original position, whereupon the operation is repeated.

One form of construction of the invention is shown in the annexed drawing.

Fig. 1 being a side view of the device.

Fig. 2 a section on the line II—II of Fig. 1, and

Fig. 3 a development of the cam cylinder.

The reciprocating rack 4 actuating the longitudinal slide has fixed to it, by means of screws 5, a sleeve 6 having in its cylindrical bore the cam cylinder 7. This cylinder is connected by a rod 8 to the rack 10 actuating the transverse supports. Setting rings 9, of which only one is shown, allow of regulating the distance between the cam cylinder 7 and the rack 10, as required. The cam cylinder 7 has uniformly distributed on its circumference, and parallel with its axis, six long grooves 11 and two short grooves 12 with oblique grooves 13 connecting them alternately at opposite ends to form a continuous cam way, in which engages a stud or pin 14 removably mounted in the sleeve 7.

The action of the device is as follows:

During the reciprocating movement of the sleeve 6, stud 14 slides in the longitudinal grooves 11 and at the end of each movement rotates the cam cylinder 7 through 45° by means of the oblique grooves 13. The cam cylinder thus remains stationary in the longitudinal sense until the stud 14 enters the first of the short grooves 12, which prevents the stud from sliding to the other end of the cylinder, so that it must take the cylinder with it, and this movement is transmitted by the rod 8 and rack 10 to the vertical axle of the transverse support. During the next movement of the sleeve 6, the stud 14 enters the second short groove 12, and returns the feed cylinder to its original position, whereupon the operation is repeated.

It is of special advantage that during the successive periods of work all the parts are only subjected to pull, so that there can be no elastic play. The changing over of the transverse support movement can be done in a second, the stud 14 being withdrawn from the groove, the cam cylinder 7 turned through 90, 180 or 270° and the stud reinserted into the proper groove. By mere withdrawal of the stud, the transverse support is immediately stopped and wholly disconnected from the drive, which is especially of advantage in setting the machine.

This simple and conventional construction results in a minimum consumption of power, which falls to zero when running idle.

What I claim is:

1. In a mechanical movement of the class described, a reciprocating rack, a sleeve fixed to said rack, a cylindrical cam member within said sleeve, a driving member coupled with said cam member and means for intermittently coupling said sleeve with said cam member to actuate said driving member, said sleeve normally sliding over said cam member.

2. In a mechanical movement of the class described a reciprocating rack, a sleeve member rigidly fixed to said rack, a cylindrical cam member disposed within said sleeve, a driving member coupled to said cam member, said cam member being provided with a cam way and a stud carried by said sleeve and sliding in said cam way, said cam way comprising a plurality of longitudinal grooves connected at their ends by acute angular grooves and a plurality of short grooves connected to said other grooves, whereby said cam member is rotated during a series of reciprocating movements of the sleeve and in the course of a succeeding reciprocating movement is moved axially by the engagement of said stud in said short grooves thereby actuating said driving member.

3. A driving mechanism of the class described comprising a reciprocating rack, a cylindrical cam member, a sleeve enclosing said cam member and fixed rigidly to said rack, a driving member coupled to said cam member, said cam member having formed therein a plurality of longitudinally disposed grooves extending the length of said cam member, a pair of short longitudinal and oblique grooves connecting said grooves and oblique grooves connecting said longitudinal grooves to form an endless cam way, a pin carried by said sleeve and riding in said cam way whereby upon reciprocation of said rack, said pin will ride in said longer cam grooves and through the medium of said oblique grooves rotate said cam member, said shorter grooves acting to couple said cam member to said sleeve whereby there is imparted to said driving member a longitudinal movement.

The foregoing specification signed at Cologne, Germany, this 14th day of November 1922.

FRITZ DEURING.

In presence of two witnesses—
FRITZ VOGEL,
ERNST NIEDEMANN.